Aug. 4, 1959 — G. A. LYON — 2,898,153
WHEEL COVER
Filed July 22, 1955
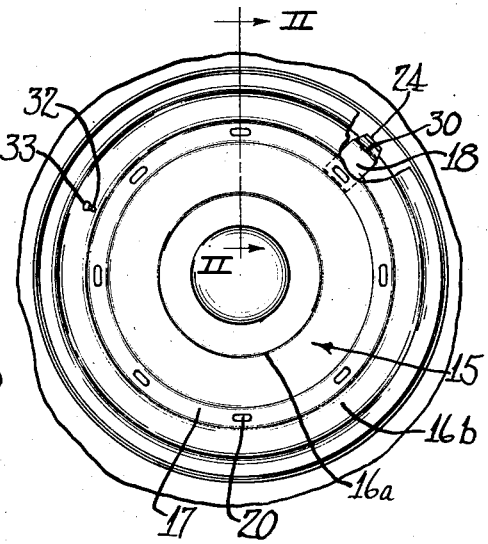
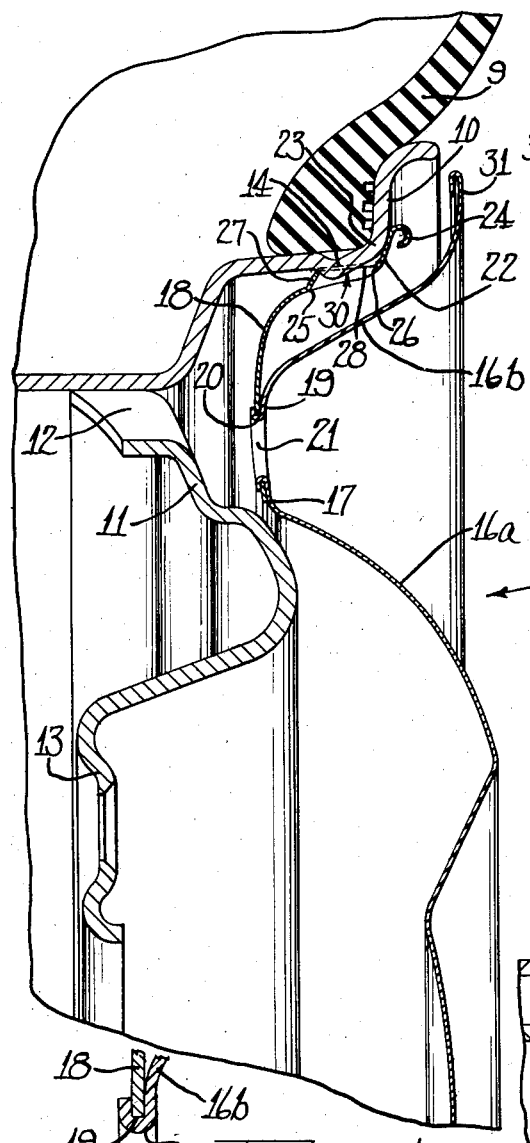
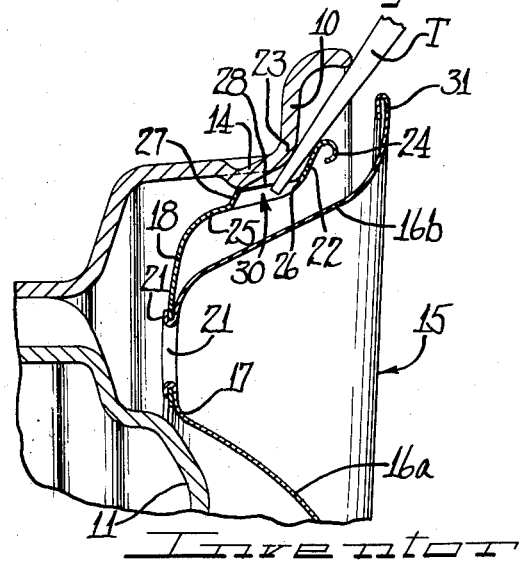
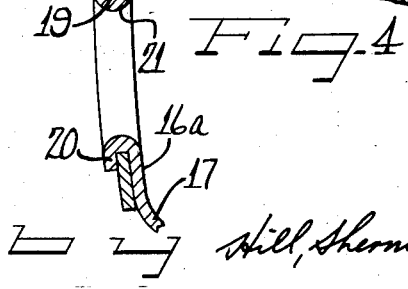
Inventor
George Albert Lyon

2,898,153
WHEEL COVER

George Albert Lyon, Detroit, Mich.

Application July 22, 1955, Serial No. 523,758

7 Claims. (Cl. 301—37)

This invention relates to automobile wheel covers and more particularly to cover retaining means.

It is an object of this invention to provide an automobile wheel cover with novel retaining means for floatingly and resiliently supporting the cover on the wheel.

Another object of this invention is to provide cover retaining means for a wheel cover which may be fastened to the cover in such manner as to take advantage of an aperture left in the cover in the fastening for use in the circulation of wheel cooling air through the wheel.

In accordance with the general features of this invention, there is provided in a cover structure for a wheel a circular wheel cover and cover retaining spring elements for attaching the cover to the wheel, each element being secured to the cover by eyelet-like means through the eye of which wheel cooling air can circulate.

In accordance with the other features of the invention, there is provided in a cover structure for a wheel having a central supporting body part and a multi-flange tire rim secured thereto and with one of its flanges provided with radially inwardly projecting spaced protuberances, a circular wheel cover having a main part for disposition over said wheel and a plurality of circularly spaced radial spring elements on the rear side of said part, each having a radially inner end secured to the rear side of said main part and a radially outer free end generally following the contour of the inner surface of said main part but spaced therefrom, said outer end having a recessed area to receive a corresponding protuberance and being resiliently flexible upon pressure against the protuberance so that said recessed area can cammingly flex radially inwardly until the protuberance is disposed in said recessed area upon pushing of the cover axially into the wheel.

Other objects and features of this invention may more fully appear from the following detailed description taken in connection with the accompanying drawings which illustrate a single embodiment thereof and in which—

Figure 1 is a fragmentary side view of a wheel structure having a cover embodying the features of this invention and partly broken away to show one of the spring fastening elements;

Figure 2 is an enlarged fragmentary cross-sectional view taken on the line II—II of Figure 1 looking in the direction indicated by the arrows;

Figure 3 is a fragmentary cross-sectional view similar to Figure 2 showing how the end of a pry-off tool is inserted behind one of the spring elements in the release of the cover from the wheel; and Figure 4 is an enlarged fragmentary cross-sectional view of one of the eye connections between the cover and one of the fingers.

As shown on the drawings:

While in the accompanying drawings there is shown one form of an automobile wheel construction of the general type now used extensively in the automotive industry, it will be appreciated that other forms of wheel structures can be used with my novel cover retaining means.

The reference character 9 designates generally a conventional pneumatic tire mounted in the customary way upon a multi-flange drop-center type of tire rim 10 which is, in turn, carried upon a central wheel supporting body 11 suitably attached thereto and having spaced or circulating openings 12 between the body and the rim. The central portion of the wheel body 11 is provided with the usual bolt-on flange 13 by means of which the wheel assembly may be detachably mounted on the axle of a vehicle. One of the generally axially extending flanges of the tire rim is provided with a plurality of circumferentially spaced protuberances or bumps 14. These bumps are disposed radially inwardly from the material of the rim flange and should correspond in number and spacing with the spring elements on the wheel cover to be hereinafter described. Any suitable number may be employed.

Cooperable with the aforesaid wheel is a sheet metal wheel cover 15 which may be made from any suitable metallic sheet, such, for example, as stainless steel, and may be ornamented and embellished as desired. The cover is axially dished inwardly to provide an annular depression therein defined by divergent central and outer cover portions 16a and 16b.

The bottom 17 of the annular depression has attached to its rear side a plurality of circumferentially spaced cover retaining spring clip elements or fingers 18 disposed on the rear side of the cover and embodying the features of this invention. Each of the fingers 18 has its radially inner end provided with an aperture 19 through which a flange 20, defining an eye or hole 21 in the cover, extends. This flange lock seams the finger to the cover as shown in Figure 4 and also provides an air circulating hole in the cover at the bottom 17 of the cover depression. These eye connections correspond in number to the resilient or spring elements and, as shown in Figure 1, for illustration, may comprise eight in number.

The outer end of each finger 18 is curved so as to follow generally the contour of the rear side of cover portion 16b and includes a radially offset terminal end 22 for abutting a shoulder 23 in the flange rim 10. Actually, the terminal of the end 22 may include a turned pry-off edge 24 for reinforcing the finger. In reality, the free end 22 of the finger 18 is angled adjacent the tire rim flange shoulder 23 (Fig. 3).

An axially extending leg or portion 25 of the angled end of the spring element is provided with an aperture or recess 26 defined by an upstanding end or erect portion 27 and side or erect flanges 28. These flanges are formed continuous into a radially erect portion by the recessing of the hole 26 in the cover and so as to extend around three sides of a bump or protuberance 14 when the same is received in the recess or pocket 30 defined by the flanges.

It will be appreciated that all of these spring elements are of identical construction and, hence, the foregoing description of one suffices for all. Also, each spring element may be made of any suitable width depending upon the width of the protuberance or bump 14 with which it is designed to cooperate.

The outer edge of the cover 15 may be slightly turned, as designated at 31, to reinforce the same. Also, as shown in Figure 1, the cover may be apertured at 32 to receive a valve stem 33 in the usual manner.

The spring fingers may be made of any suitable material, such, for example, as spring steel, and lend themselves to economical large scale production as stampings.

In the application of the cover to the wheel, the hole 32 is first aligned with the valve stem which also serves to align the spring fingers 18 with the protuberances or bumps 14. The reason for this is that the bumps are of a predetermined location with reference to the valve stem and this may be taken advantage of in using the valve stem to position the fingers in alignment with the bumps.

Thereafter, the cover is pressed axially into the body of the wheel engaging the flanges 27 and 28 of each finger with the corresponding bump or protuberance.

Now, it will be appreciated that normally the outer edges of the pocket defining flanges 27 and 28 are disposed in a circle of a diameter in excess of the diameter of a circle common to the radially innermost surfaces of the bumps 14. As a consequence, in the application of the cover, the flanges 27 and 28 of each finger pocket, upon engaging the wedge-like surface to the corresponding bump, are cammed radially inwardly thus deflecting the finger radially inwardly to permit the bump to ride over the top of end flange 27 and to become seated in the pocket 30. When in this position, the finger 18 is effectively locked to the bump with its end portion 22 in abutment with tire rim flange shoulder 23. Also, this structure permits of the cover 15 to be floatingly carried on the wheel out of contact therewith except through the fingers 18.

When it is desired to remove the cover 15 from the wheel, a pry-off tool T is inserted in the space between the tire rim 10 and the cover edge 31 until it is engaged behind the turned terminal 22 of one of the spring clips 18. Thereafter, upon a twisting or pry-off manual force being applied to the tool T, the engaged finger can be depressed radially inwardly until the bump 14 is no longer pocketed therein at which time the cover can be easily thereafter moved out of the wheel. It should not be necessary to forcibly disengage more than one spring element from a bump in order to effect removal of the cover. However, if it is necessary, additional spring elements may be likewise disengaged from the bumps progressively around the cover until enough of them are disengaged to release the cover.

It will be understood that modifications and variations may be effected without departing from the scope of the novel concepts of the present invention.

I claim as my invention:

1. In a wheel structure, a wheel including a central supporting body part and a multi-flange tire rim and a flange portion on the wheel provided with radially projecting spaced bumps, a circular wheel cover member for overlying detachable engagement upon the wheel including an outer cover margin and a dished area disposed radially inwardly thereof, said dished area having circumferentially spaced clips each having an inner radial portion and an outer axial portion confronting the bumps, said axial portions having circumferentially spaced radially erect portions defining seats in which the bumps are lodged, said erect portions including radially facing gripping edges disposed in a circle of a diameter slightly at variance with the diameter of a circle common to said bumps and upon engagement of said edges against said bumps in the application of the cover to the wheel, the edges are resiliently cammed radially over the bumps until the bumps enter the seats by the resilient snapping of the edges over the bumps.

2. In a wheel structure, a wheel including a central supporting body part and a multi-flange tire rim and a flange portion on the wheel provided with radially projecting spaced bumps, a circular wheel cover member for overlying detachable engagement upon the wheel including an outer cover margin and a dished area disposed radially inwardly thereof, said dished area having circumferentially spaced clips each having an inner radial portion and an outer axial portion confronting the bumps, said axial portions having circumferential spaced radially erect portions defining seats in which the bumps are lodged, said erect portions including radially facing gripping edges disposed in a circle of a diameter slightly at variance with the diameter of a circle common to said bumps and upon engagement of said edges against said bumps in the application of the cover to the wheel, the edges are resiliently cammed radially over the bumps until the bumps enter the seats by the resilient snapping of the edges over the bumps, said radially erect portion engaging against at least three sides of said bump and with said portion being turned from and radially away from the cover.

3. In a wheel structure, a wheel including a central supporting body part and a multi-flange tire rim and a flange portion on the wheel provided with radially projecting spaced bumps, a circular wheel cover member for overlying detachable engagement upon the wheel and having circumferentially spaced radially erect portions defining seats in which the bumps are lodged, said erect portions including radially facing gripping edges disposed in a circle of a diameter slightly in excess of the innermost diameter of a circle common to said bumps and upon engagement of said edges against said bumps in the application of the cover to the wheel, the edges are resiliently cammed radially over the bumps until the bumps enter the seats by the resilient snapping of the edges over the bumps, said radially erect portions being carried by clips fastened to the cover with the clips terminating in pry-off portions positioned radially and axially outwardly from said erect portions and with the cover concealing the clips and spaced from the wheel to permit the entrance of a pry-off tool behind the cover and the pry-off portions of the clips to dislodge the edges from behind the bumps.

4. In a wheel structure, a wheel including a central supporting body part and a multi-flange tire rim and an axial rim flange portion on the wheel provided with radially projecting spaced bumps and connected at its outer end to a radial rim flange, a circular wheel cover member for overlying detachable engagement upon the wheel and having an outer cover margin spaced from the tire rim, circumferentially spaced clips concealed by and carried on said cover and having radially erect portions defining seats engageable on at least three sides of the bumps and in which the bumps are lodged, said erect portions including radially facing gripping edges disposed in a circle of a diameter slightly in excess of the innermost diameter of a circle common to said bumps and upon engagement of said edges against said bumps in the application of the cover to the wheel, the edges are resiliently cammed radially over the bumps until the bumps enter the seats by the resilient snapping of the edges over the bumps, said clips having pry-off portions opposed to the radial rim flange so that a pry-off tool may be slipped underneath the cover margin behind the pry-off portions to dislodge the gripping edges.

5. In a wheel structure, a wheel including body and rim parts with one of the parts having an axial flange portion, a cover body for disposition at the axially outer side of the wheel and circumferentially spaced cover retaining fingers each connected at one end to the cover body and extending generally radially therefrom, said fingers each having a dished generally radially and freely flexible finger portion leading into and backing up a generally axially outwardly extending freely flexible finger portion with the latter finger portion disposed in generally face to face relation with said axial flange portion and provided with a free edge resiliently deflectable with said axial finger portion and said free edge being stressed radially upon engagement with said axial flange portion, said free edges being disposed in a common circle having a diameter slightly at variance with said axial flange portion for tensioned cover retaining engagement therebetween, both of said finger portions of each finger being resiliently flexible upon stressing of said edges so that substantially all of each finger resiliently flexes from its end connected to the cover body, said axial finger portion also being resiliently flexible radially with respect to said radial finger portion to permit ready adjustment for any misalignment between the particular finger and the axial flange portion, and a portion of said cover being bottomed against said wheel to back up the engagement of said free edge with said axial flange portion, said portion comprising a pry-off terminal and with said cover body having an outer margin spaced axially of the pry-off portion as well as axially of the rim enabling a pry-off tool to be inserted underneath the cover body and applied to the pry-off terminal to disengage the fingers from tensioned assembly with said axial flange portion.

6. The wheel structure of claim 5 further characterized by said axial flange portion having a cover-retaining bump, and the axial finger portion of one of said retaining fingers having a notched area peripherally defined by a radially outwardly turned flange area and with said free edge being engaged about three sides of the bump.

7. In a wheel structure including a tire rim having an intermediate rim flange connected to an outer rim flange area and a series of bumps on the intermediate rim flange, a cover section including an outer margin spaced from the rim and having an axially inwardly dished area spaced radially iwnardly of the outer margin, a series of circumferentially spaced resiliently deflectable cover retaining extensions emanating from the dished area including a generally radially extending portion and an axially extending portion confronting the intermediate rim flange at the outer end of the radially extending portion and with the axially extending portion terminating in a radially outwardly turned generally radially extending pry-off terminal spaced axially inwardly of the cover margin for receipt of a pry-off tool in the space between the cover margins so the pry-off tool may be levered against the pry-off terminal, and recessed pocket areas on the axially extending portions for receipt of the bumps with the axially extending portions on the extensions normally having a diameter exceeding the inside diameter of the intermediate rim flange to aid in maintaining the cover section in tensioned cover retaining assembly on the wheel by virtue of the locking engagement between the bumps and the recessed pocket areas, the recessed area having end and side flanges turned radially outwardly of the axial portion into edgewise engagement with the bump to resist circumferential and axial displacement of the cover section.

References Cited in the file of this patent
UNITED STATES PATENTS

| | | |
|---|---|---|
| 2,669,487 | Horn | Feb. 16, 1954 |
| 2,683,629 | Lyon | July 13, 1954 |
| 2,683,630 | Lyon | July 13, 1954 |